May 18, 1937.　　　G. ZANINOVICH　　　2,080,993
ANIMAL TRAP
Filed Nov. 11, 1936　　　3 Sheets-Sheet 1
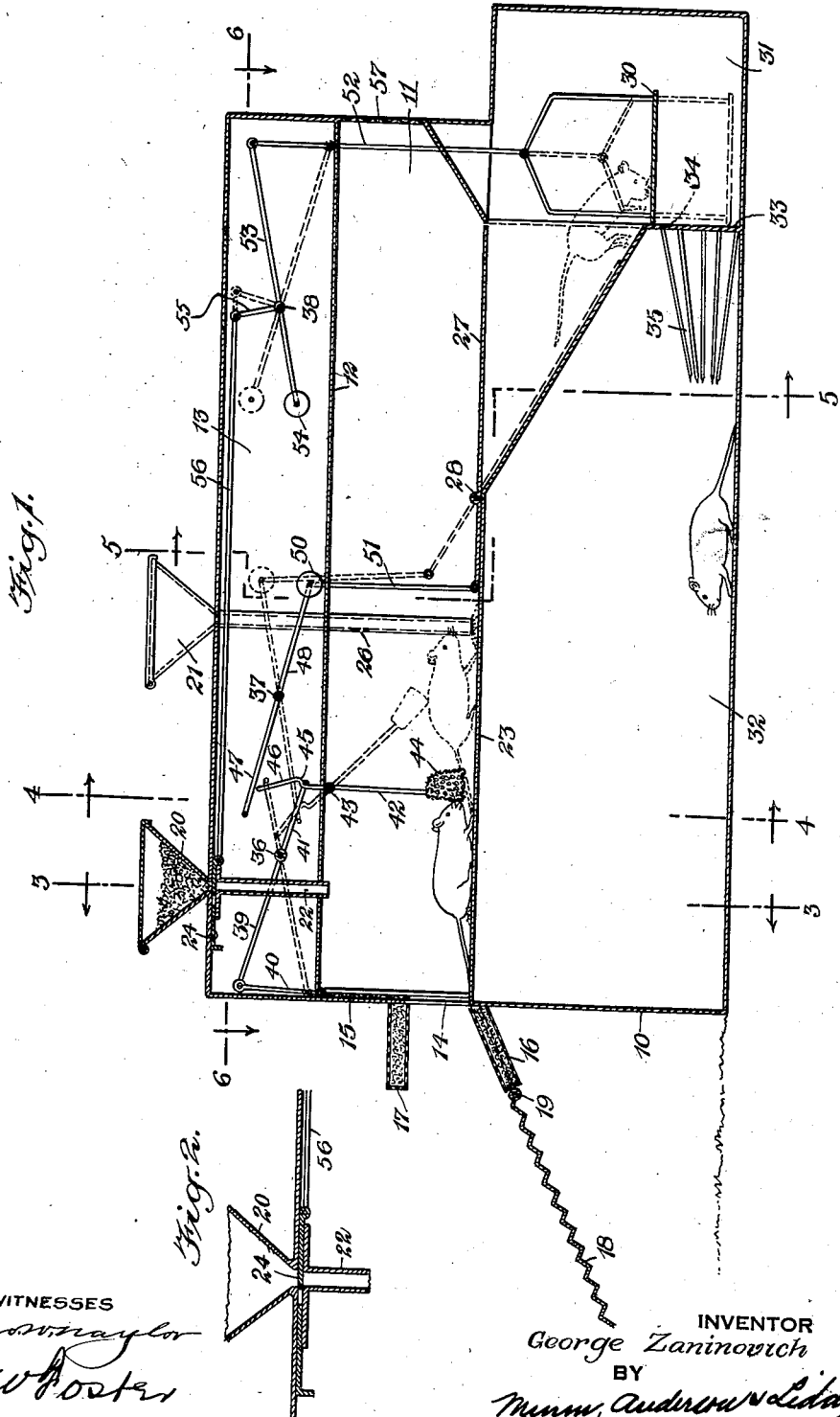
WITNESSES
INVENTOR
George Zaninovich
BY
ATTORNEYS May 18, 1937.  G. ZANINOVICH  2,080,993
ANIMAL TRAP
Filed Nov. 11, 1936  3 Sheets-Sheet 2
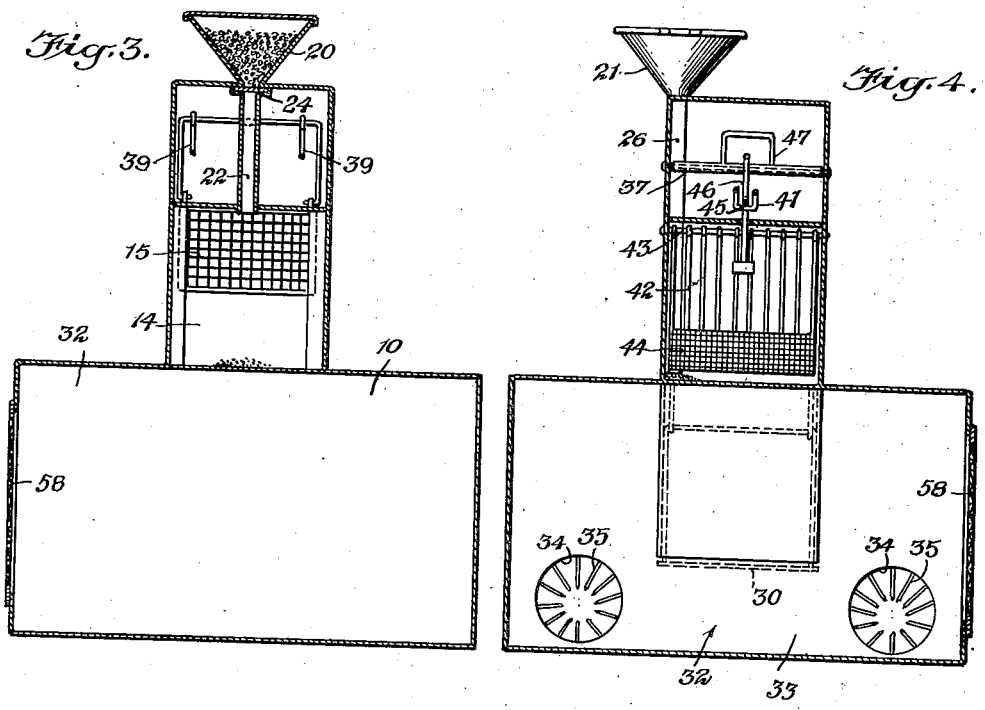
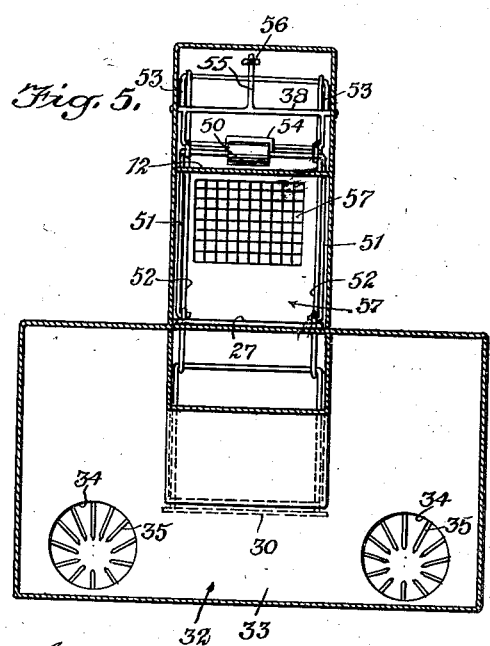
WITNESSES
INVENTOR
George Zaninovich
BY
ATTORNEYS May 18, 1937.　　　　G. ZANINOVICH　　　　2,080,993
ANIMAL TRAP
Filed Nov. 11, 1936　　　3 Sheets-Sheet 3

WITNESSES

INVENTOR
George Zaninovich
BY
ATTORNEYS

Patented May 18, 1937

2,080,993

UNITED STATES PATENT OFFICE 2,080,993

ANIMAL TRAP

George Zaninovich, Dinuba, Calif.

Application November 11, 1936, Serial No. 110,236

5 Claims. (Cl. 43—76)

This invention relates to animal traps, an object of the invention being to provide a trap of this character which includes a main casing in which the animals are collected and an entrance casing through which the animals pass and in doing so cause the falling of a trap door to close the entrance to said casing; then cause the door to be elevated to reset position, and also cause bait to be deposited on the floor of the entrance casing.

A further object is to provide a trap of this character which will permit a continuous entrance of animals thereinto, and which will accommodate the animals until they are desired for use or to be destroyed.

With these and other objects in view, the invention consists in certain novel features of construction and combinations and arrangements of parts, all of which will be more fully hereinafter described and pointed out in the claims.

In the accompanying drawings—

Fig. 1 is a view in longitudinal section through my improved trap;

Fig. 2 is a fragmentary view in section illustrating in detail the cut-off valve of one of the bait-feeding hoppers;

Fig. 3 is a view in vertical transverse section on the line 3—3 of Fig. 1;

Fig. 4 is a view in vertical transverse section on the line 4—4 of Fig. 1;

Fig. 5 is a view in vertical transverse section on the staggered line 5—5 of Fig. 1;

Figure 6:
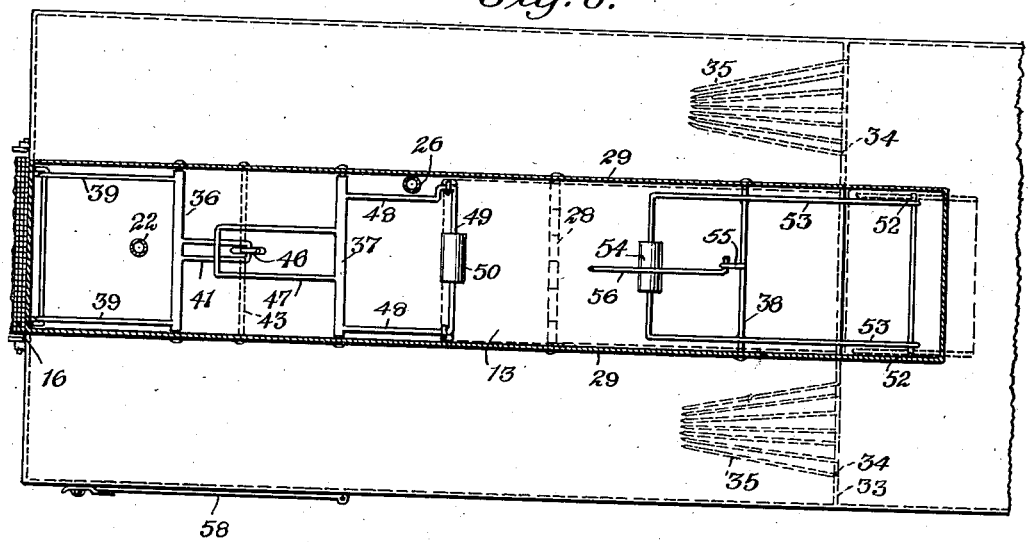
Fig. 6 is a horizontal sectional plan view on the line 6—6 of Fig. 1.
Figure 7:
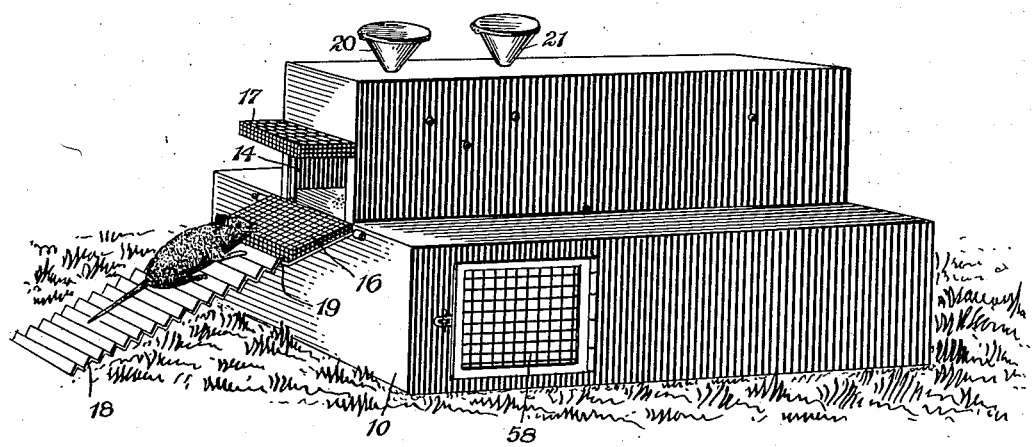
Fig. 7 is a perspective view of the trap.

My improved trap comprises a main casing 10 for the reception or accommodation of animals therein, and above this main casing 10 an entrance casing 11 is provided, which may be, as illustrated, narrower than the main casing 10 but extending longitudinally and above the same. This entrance casing 11 is preferably divided by a horizontal partition 12 to form an upper compartment 13 in which most of the operating mechanism of the trap is located. The entrance casing 11 is provided at one end with an opening 14 adapted to be closed by a drop door 15, and at the bottom of the opening 14 a perforated bait-containing receptacle 16 is provided and a similar receptacle 17 is secured to the lower end of the door 15. A ramp 18 is preferably hingedly connected to the receptacle 16, as shown at 19, so that it may be swung up out of the way when not desired for use, but normally this ramp extends downwardly to the ground and guides the animals through the opening 14 into the casing 11.

The entrance casing 11 is provided with two hoppers 20 and 21, which are adapted to contain bait, and I would have it understood that in employing the term "bait" I use the same in its broadest sense to include any material, such as grain or other food which will attract the animals. The hopper 20 is located in advance of the hopper 21 and has a relatively short spout 22 extending downwardly through the partition 12 and adapted to direct bait on to the floor 23 of the casing 11. This hopper 20 is provided with a cut-off valve 24 controlled by mechanism to be hereinafter described.

The hopper 21 is provided with a relatively long spout 26, which extends downwardly and terminates close to the floor 23, so that while this hopper 21 continuously feeds bait on to the floor 23, its outlet spout is so close to the floor, that a relatively small amount of bait is permitted to escape.

A tilting trap door 27 constitutes the floor of the rear portion of the entrance casing 11, and this trap door 27 is pivotally supported on a cross shaft 28 mounted in the side walls 29 of the casing 11. This trap door 27 directs the animals on to an elevator 30 which is located in a compartment 31 at the rear end of casing 10, and this compartment is separated from the main compartment 32 of said casing by a transverse partition wall 33. This partition wall 33 is provided with openings 34, and around which inclined sharp wires 35 are provided and project into the compartment 32 so that animals entering the compartment 31 will pass through the openings 34 into the compartment 32 and cannot return through the openings 34 because of the arrangement of wires 35.

In the chamber or compartment 13 above the entrance casing 11, I provide three countershafts 36, 37 and 38, which have rotary mounting in the side walls 29 of the casing. The shaft 36 is provided with a pair of forwardly extending crank arms 39, which are connected by links 40 with the door 15. This shaft 36 is also provided with a U-shaped crank arm 41 extending rearwardly of the casing and is adapted to be engaged by a trigger 42 to hold the door 15 in its set elevated position. This trigger 42 is in the form of a gate but constitutes a lever which is pivotally mounted between its ends on a cross rod 43, and at its lower end carries a bait receptacle 44. This trigger 42 has a shoulder or offset portion 45, which normally engages the end of lever 41 to hold the door in its elevated position. The trigger 42 is provided with an upwardly projecting cam extension 46, which is adapted to be engaged by an upwardly projecting U-shaped crank arm 47 on the shaft 37. This U-shaped arm 47 operates to force the lever 41 downwardly to elevate the door and permit the trigger 42 to swing to its normal vertical position to re-engage said arm 41 and re-set the door. To enable this arm 47 to perform these functions, it will be noted that it is located above the trigger and the arm 41.

The shaft 37 above referred to is provided with a pair of upwardly projecting crank arms 48, which are connected by a cross rod 49 on which a counterweight 50 is located. The arms 48, at their rear ends, are connected by links 51 with the shorter end of the trap door 27.

The elevator 30 above referred to is supported by a pair of vertical links 52, which at their upper ends are connected to the rear end of a rectangular pivoted frame 53. This frame 53 is secured between its ends to the shaft 38 above referred to, and at its forward end is provided with a counterweight 54 which operates to return the elevator to its higher position, and also performs the function of closing the valve 24. To perform this last function the shaft 38 is provided with a crank arm 55, which is connected by a rod 56 with the valve 24. Thus it will be noted that when the elevator 30 moves downwardly it will cause the valve 24 to open, and when the elevator returns to its higher position this valve will be closed.

The operation of the trap is as follows. An animal passes up the ramp 18 attracted by the bait in the receptacles 16 and 17, and also by the bait inside the trap. It feeds upon the small amount of bait upon the floor 23 which has been dropped from the hopper 20, and then attempts to get at the bait in the receptacle 44, or to push past this receptacle 44 to get at the bait dropped from the hopper 21, and on its contact with the bait receptacle 44, the animal causes the trigger 42 to pivot, releasing the crank arm 41 and allowing the door 15 to close the opening 14. When this door drops, the animal of course makes an attempt to escape and seeing light which enters through openings 57 in the end of the casing 11, he moves rapidly in that direction. He then finds himself on the trap door 27 which, due to his weight, is caused to tilt throwing the animal downwardly and rearwardly upon the elevator 30. The weight of the animal causes the elevator 30 to move downwardly and of course he jumps rapidly off the elevator and passes naturally through the opening 34 into the main compartment 32. This main compartment 32 may have any suitable arrangement of door or outlet 58 from which the animals may be removed.

When the animal causes the trap door 27 to tilt, this operation of the door, through the medium of the links 51 and the crank arms 48, causes the shaft 37 to turn bringing the crank arm 47 down upon the crank arm 41, thus causing the shaft 36 to turn in a direction to elevate the door. This movement is sufficient to permit the arm 41 to re-engage the trigger 42 as the latter is swung back to its vertical position after having been moved by the animal. A downward movement of the elevator 30, through the medium of the rods 52 and pivoted frame 53, causes the shaft 38 to turn and through the medium of the crank arm 51 and rod 56 momentarily open the valve 24 to allow a certain amount of grain to fall on to the floor 23. When the elevator returns to its higher position, due to the counterweight 54, the valve 24 is again closed and the trap is ready for the next animal entering the same.

While I have illustrated and described what I believe to be the preferred embodiment of my invention, it is obvious that various slight changes may be made with regard to the form and arrangement of parts without departing from my invention, and hence I do not limit myself to the precise details set forth but consider myself at liberty to make such changes and alterations as fairly fall within the spirit and scope of the claims.

I claim:

1. An animal trap comprising a lower casing or receptacle, an upper entrance casing above the first-mentioned casing having an entrance opening, a vertically movable door adapted to close said opening, a trigger operatively engaged with the door and adapted to hold the door in elevated position, a bait receptacle on the trigger adapted to be operated by an animal to release the door and permit the same to fall, a pivoted trap door in the floor of the entrance casing, door-resetting means operated by the trap door when moved by the weight of an animal, to elevate and reset the door, a bait-feeding hopper discharging into the entrance casing, an elevator on to which animals are directed by the trap door, and a valve controlling the passage of bait from said hopper operatively connected to said elevator.

2. An animal trap comprising a lower casing or receptacle, an upper entrance casing above the first-mentioned casing having an entrance opening, a vertically movable door adapted to close said opening, a trigger operatively engaged with the door and adapted to hold the door in elevated position, a bait receptacle on the trigger adapted to be operated by an animal to release the door and permit the same to fall, a pivoted trap door in the floor of the entrance casing, door-resetting means operated by the trap door when moved by the weight of an animal, to elevate and reset the door, and a hopper in the rear of said trigger depositing bait on to the floor of said entrance casing.

3. An animal trap comprising a lower casing or receptacle, an upper entrance casing above the first-mentioned casing having an entrance opening, a vertically movable door adapted to close said opening, a trigger operatively engaged with the door and adapted to hold the door in elevated position, a bait receptacle on the trigger adapted to be operated by an animal to release the door and permit the same to fall, a pivoted trap door in the floor of the entrance casing, door-resetting means operated by the trap door when moved by the weight of an animal, to elevate and reset the door, a bait-feeding hopper discharging into the entrance casing, an elevator on to which animals are directed by the trap door, a valve controlling the passage of bait from said hopper operatively connected to said elevator, and a hopper in the rear of said trigger depositing bait on to the floor of said entrance casing.

4. An animal trap, comprising a main casing, a transverse partition in said casing dividing the same into a compartment for animals and an elevator compartment at one end thereof, an entrance casing above the main casing, a door controlling the entrance to said entrance casing, a trigger normally holding the door elevated, a bait receptacle on the trigger adapted when moved by an animal to release the door and permit it to fall to closed position, a trap door in the floor of said entrance compartment and adapted to direct animals on to the elevator, a hopper feeding bait into the entrance compartment, and means operatively connecting the elevator with said hopper to control the escape of bait therefrom.

5. An animal trap comprising a main casing, a transverse partition in said casing dividing the same into a compartment for animals and an elevator compartment at one end thereof, an entrance casing above the main casing, a door controlling the entrance to said entrance casing, a trigger normally holding the door elevated, a bait receptacle on the trigger adapted when moved by an animal to release the door and permit it to fall to closed position, a trap door in the floor of said entrance compartment and adapted to direct animals on to the elevator, a hopper feeding bait into the entrance compartment, means operatively connecting the elevator with said hopper to control the escape of bait therefrom, said partition having an opening therethrough for the passage of animals, and wires around said opening arranged to permit passage of the animals in one direction only.

GEORGE ZANINOVICH.